(12) United States Patent
Pister et al.

(10) Patent No.: US 7,873,043 B2
(45) Date of Patent: Jan. 18, 2011

(54) DIGRAPH NETWORK SUPERFRAMES

(75) Inventors: Kristofer S. J. Pister, Orinda, CA (US); Robert M. Shear, El Cerrito, CA (US)

(73) Assignee: Dust Networks, Inc., Hayward, CA (US)

( * ) Notice: Subject to any disclaimer, the term of this patent is extended or adjusted under 35 U.S.C. 154(b) by 0 days.

(21) Appl. No.: 12/220,493

(22) Filed: Jul. 25, 2008

(65) Prior Publication Data

US 2008/0285582 A1 Nov. 20, 2008

Related U.S. Application Data

(63) Continuation of application No. 11/152,043, filed on Jun. 13, 2005, now Pat. No. 7,420,980, which is a continuation-in-part of application No. 10/960,709, filed on Oct. 6, 2004, now Pat. No. 7,529,217.

(60) Provisional application No. 60/557,148, filed on Mar. 27, 2004.

(51) Int. Cl.
- H04L 12/56 (2006.01)
- H04J 3/16 (2006.01)
- H04Q 7/20 (2006.01)

(52) U.S. Cl. .................... 370/389; 370/395.4; 370/338; 370/437; 455/450

(58) Field of Classification Search ................. 370/256, 370/264, 311–389, 400–510, 229, 252; 342/357.1; 455/450, 558, 427, 574
See application file for complete search history.

(56) References Cited

U.S. PATENT DOCUMENTS

| | | | |
|---|---|---|---|
| 3,737,746 A | 6/1973 | Cielaszyk et al. | |
| 4,550,397 A | 10/1985 | Turner et al. | |
| 4,939,726 A | 7/1990 | Flammer et al. | |
| 4,947,388 A | 8/1990 | Kuwahara et al. | |
| 5,007,052 A | 4/1991 | Flammer | |
| 5,007,752 A | 4/1991 | Yasumi et al. | |
| 5,079,768 A | 1/1992 | Flammer | |
| 5,115,433 A | 5/1992 | Baran et al. | |
| 5,128,932 A | 7/1992 | Li | |
| 5,130,987 A | 7/1992 | Flammer | |
| 5,471,469 A | 11/1995 | Flammer, III et al. | |
| 5,488,608 A | 1/1996 | Flammer, III | |
| 5,515,369 A | 5/1996 | Flammer, III et al. | |
| 5,570,084 A | 10/1996 | Ritter et al. | |
| 5,903,566 A | 5/1999 | Flammer, III | |
| 6,049,708 A | 4/2000 | Tsujita | |
| 6,081,511 A * | 6/2000 | Carr et al. | 370/256 |

(Continued)

*Primary Examiner*—Afsar M. Qureshi
(74) *Attorney, Agent, or Firm*—Van Pelt, Yi & James LLP

(57) ABSTRACT

A method of assigning cells in a superframe using digraph link information in a network of nodes is disclosed. The method comprises determining a total number of desired digraph links in the network of nodes wherein a digraph link is a directional link specifying routing information at each node in the network between said node and a second node, and wherein the network of nodes includes a plurality of nodes each with a plurality of digraph links. The method further comprises selecting a superframe size at least large enough to accommodate the total number of desired digraph links and assigning each desired digraph link to a cell in the superframe wherein each cell in the superframe specifies a synchronized time and frequency communication plan.

26 Claims, 16 Drawing Sheets

U.S. PATENT DOCUMENTS

| | | |
|---|---|---|
| 6,208,668 B1 | 3/2001 | Dorenbosch |
| 6,347,340 B1 | 2/2002 | Coelho et al. |
| 6,621,805 B1 | 9/2003 | Kondylis et al. |
| 6,639,957 B2 | 10/2003 | Cahill-O'Brien et al. |
| 6,667,957 B1 | 12/2003 | Corson et al. |
| 6,671,525 B2 | 12/2003 | Allen et al. |
| 6,678,252 B1 | 1/2004 | Cansever |
| 6,690,655 B1 | 2/2004 | Miner et al. |
| 6,714,552 B1 | 3/2004 | Cotter |
| 6,735,178 B1 | 5/2004 | Srivastava et al. |
| 6,788,702 B1 | 9/2004 | Garcia-Luna-Aceves et al. |
| 6,804,503 B2 | 10/2004 | Shohara et al. |
| 6,826,607 B1 | 11/2004 | Gelvin et al. |
| 7,002,910 B2 | 2/2006 | Garcia-Luna-Aceves et al. |
| 7,035,240 B1 | 4/2006 | Balakrishnan et al. |
| 7,046,166 B2 | 5/2006 | Pedyash et al. |
| 7,119,676 B1 | 10/2006 | Silverstrim et al. |
| 7,127,254 B2 * | 10/2006 | Shvodian et al. ............ 455/450 |
| 7,133,373 B2 | 11/2006 | Hester et al. |
| 7,142,524 B2 | 11/2006 | Stansforth et al. |
| 7,221,686 B1 | 5/2007 | Belcea |
| 7,245,405 B2 | 7/2007 | Friedman et al. |
| 7,280,518 B2 | 10/2007 | Montano et al. |
| 7,305,240 B2 | 12/2007 | Chou et al. |
| 7,324,559 B2 | 1/2008 | McGibney |
| 7,385,943 B2 | 6/2008 | Niddam |
| 2001/0053176 A1 | 12/2001 | Fry et al. |
| 2002/0126627 A1 | 9/2002 | Shi et al. |
| 2003/0087617 A1 | 5/2003 | Shohara |
| 2003/0134644 A1 | 7/2003 | Reed et al. |
| 2004/0042405 A1 | 3/2004 | Nesbitt |
| 2004/0266481 A1 * | 12/2004 | Patel et al. .................. 455/558 |
| 2005/0041627 A1 | 2/2005 | Duggi |
| 2005/0124346 A1 | 6/2005 | Corbett et al. |
| 2005/0155839 A1 | 7/2005 | Banks et al. |
| 2005/0159106 A1 | 7/2005 | Palin et al. |
| 2005/0195105 A1 * | 9/2005 | McBurney et al. ........ 342/357.1 |
| 2005/0249170 A1 | 11/2005 | Salokannel et al. |
| 2006/0062188 A1 | 3/2006 | Nyberg et al. |
| 2006/0187866 A1 | 8/2006 | Werb et al. |
| 2006/0239333 A1 | 10/2006 | Albert et al. |
| 2007/0258508 A1 | 11/2007 | Werb et al. |
| 2008/0031213 A1 | 2/2008 | Kaiser et al. |

* cited by examiner

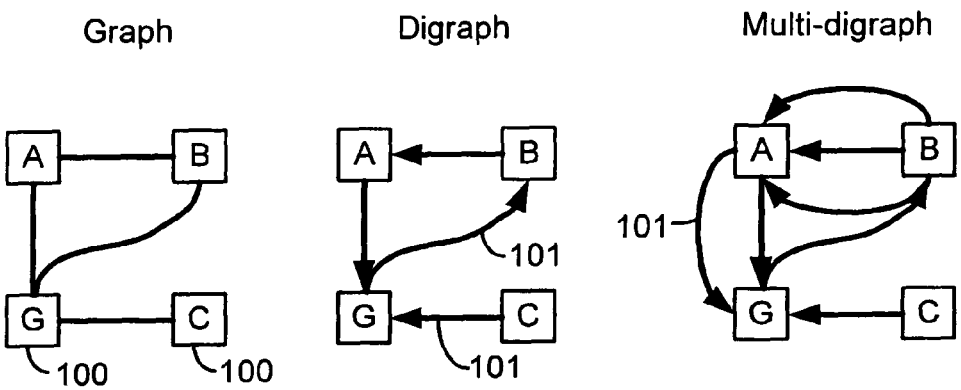
FIG. 1A     FIG. 1B     FIG. 1C
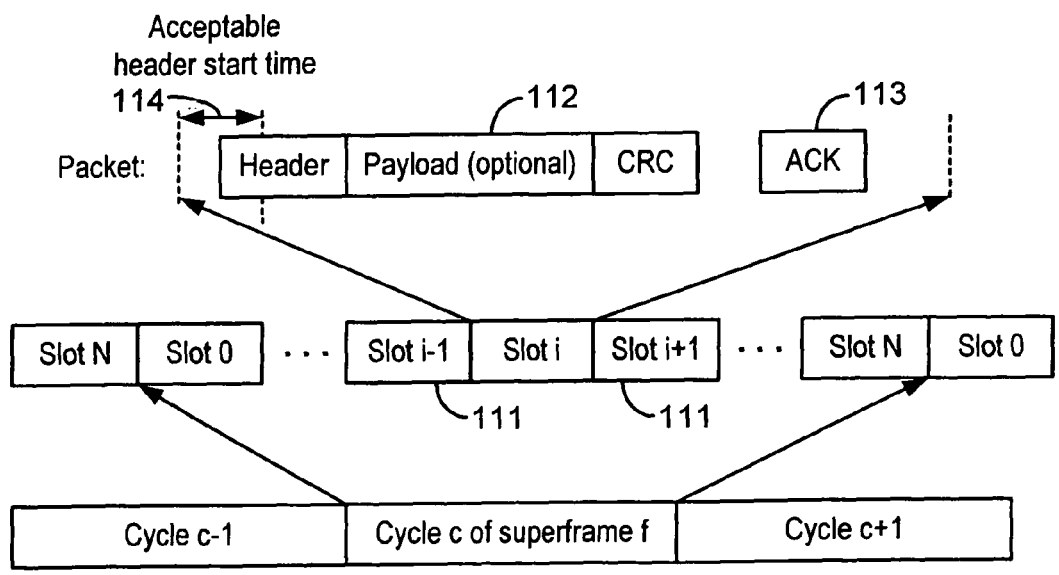
FIG. 2

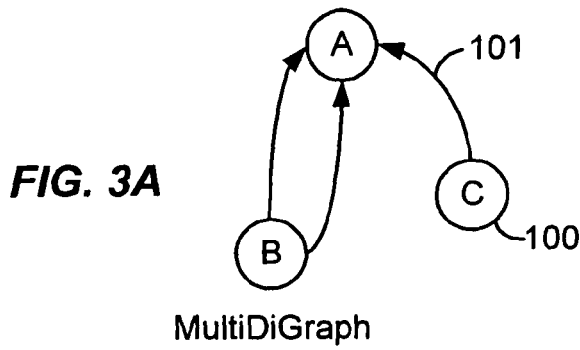
FIG. 3A MultiDiGraph
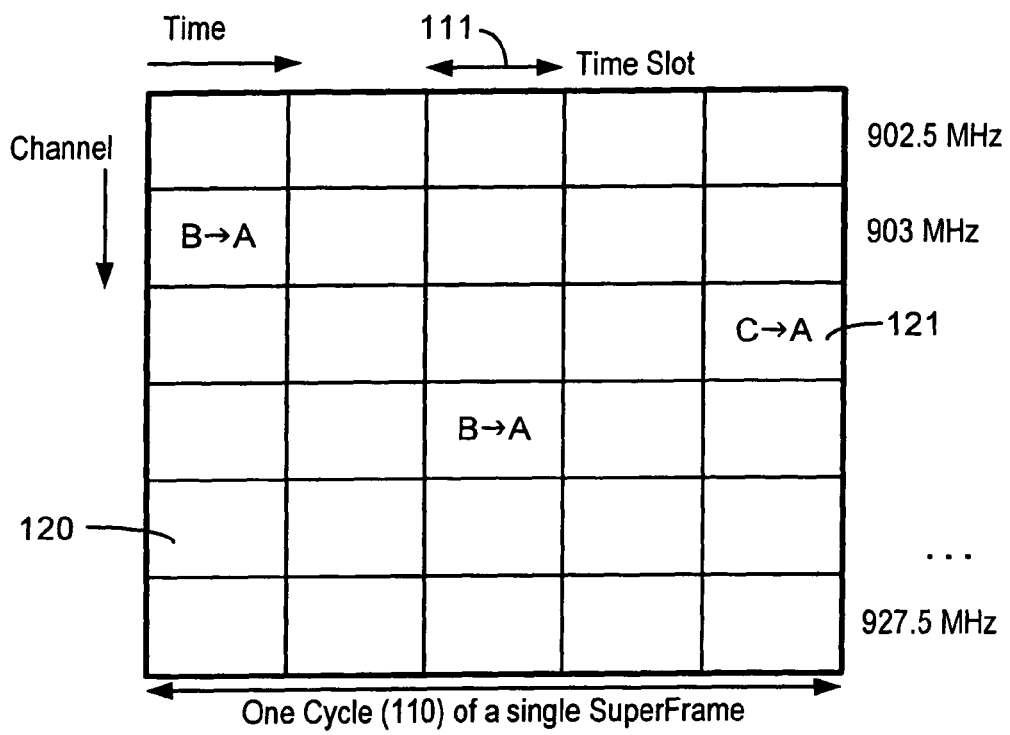
FIG. 3B
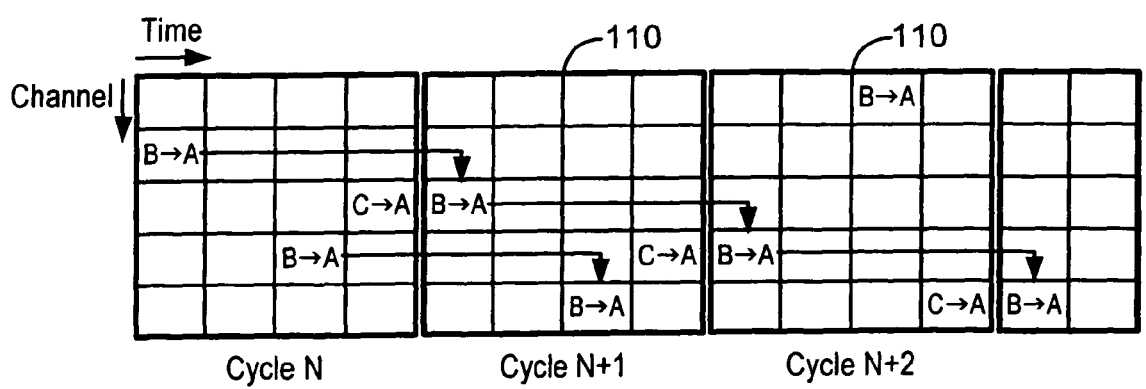
FIG. 4

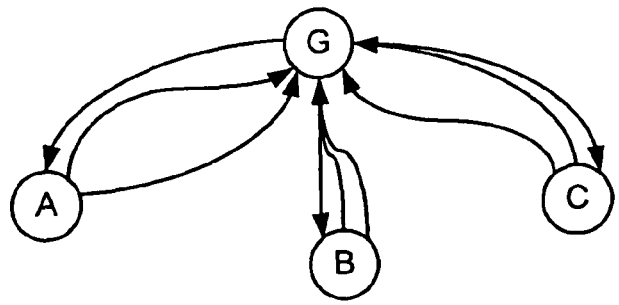
*FIG. 9A*
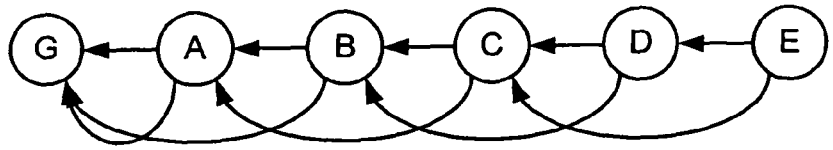
*FIG. 9B*
*FIG. 9C*
*FIG. 10A*
*FIG. 10B*

| | S0 | S1 | S2 | S3 | S4 | S5 | |
|---|---|---|---|---|---|---|---|
| | C → B | | | G → A | | | Ch 0 |
| | | B → A | | | A → B | | Ch 1 |
| | | | A → G | | | B → C | Ch 2 |

FIG. 10D

| | S0 | S1 | S2 | S3 | S4 | S5 | |
|---|---|---|---|---|---|---|---|
| | C → B | B → C | | | | | Ch 0 |
| | | | A → G | G → A | | | Ch 1 |
| | | | | | B → A | A → B | Ch 2 |

FIG. 10E

|  | | | |
|---|---|---|---|
| B1 → A1 | A1 → G | A1 → B1 | Ch 0 |
|  | B2 → A2 | A2 → G | Ch 1 |
| A3 → B3 |  | B3 → A3 | Ch 2 |
| S0 | S1 | S2 | |

|  | | | |
|---|---|---|---|
|  | G → A1, A2, A3 |  | Ch 0 |
| A2 → B2 |  | A2 → B1, B2, B3 | Ch 1 |
| A3 → G |  |  | Ch 2 |
| S3 | S4 | S5 | |

FIG. 10G

|  |  |  |  |
|---|---|---|---|
| B1 → A1 | A1 → G | A1 → B1 | Ch 0 |
|  | B2 → A2 | A2 → G | Ch 1 |
| B3 → B2 |  |  | Ch 2 |
| S0 | S1 | S2 |  |

|  |  |  |  |
|---|---|---|---|
|  | G → A1, A2, A3 |  | Ch 0 |
|  |  | A2 → B1, B2, B3 | Ch 1 |
| A3 → G |  |  | Ch 2 |
| S3 | S4 | S5 |  |

FIG. 10I

|  |  |  |  |
|---|---|---|---|
| B1 → A1 | A1 → G | A1 → B1 | Ch 0 |
|  | B2 → A2 | A2 → G | Ch 1 |
| B3 → B2 |  |  | Ch 2 |
| S0 | S1 | S2 |  |

|  |  |  |  |
|---|---|---|---|
|  | A1 → G |  | Ch 0 |
|  | B2 → A2 | A2 → G | Ch 1 |
| A3 → G |  |  | Ch 2 |
| S3 | S4 | S5 |  |

|  |  |  |  |
|---|---|---|---|
|  | G → A1, A2, A3 |  | Ch 0 |
|  |  | A2 → B1, B2, B3 | Ch 1 |
| A2 → G |  |  | Ch 2 |
| S6 | S7 | S8 |  |

FIG. 10K

DIGRAPH NETWORK SUPERFRAMES

CROSS REFERENCE TO OTHER APPLICATIONS

This application is a continuation of U.S. patent application Ser. No. 11/152,043, entitled DIGRAPH NETWORK SUPERFRAMES filed Jun. 13, 2005, now U.S. Pat. No. 7,420,980 which is incorporated herein by reference for all purposes.

This application is a continuation in part of U.S. patent application Ser. No. 10/960,709 entitled LOW-POWERED AUTONOMOUS NODE FOR MESH COMMUNICATION NETWORK filed Oct. 6, 2004, now U.S. Pat. No. 7,529,217 which is incorporated herein by reference for all purposes and which claims priority to U.S. Provisional Patent Application No. 60/557,148 entitled COMMUNICATIONS PROTOCOL FOR REMOTE SENSOR NETWORKS filed Mar. 27, 2004 which is incorporated herein by reference for all purposes.

Co-pending U.S. patent application Ser. No. 10/914,056 entitled DIGRAPH BASED MESH COMMUNICATION NETWORK filed Aug. 5, 2004 is incorporated herein by reference for all purposes.

BACKGROUND OF THE INVENTION

Digraph networks are networks of wireless nodes linked together using directional communication links. Superframe structures describe the organization of the communication between nodes of the network in terms of when communication occurs and on what frequencies the radio communication occurs. Once the communications scheduled for one superframe have occurred, a next superframe schedules the next communications. One problem that arises in a digraph network is the specification of the superframe structure. The superframe must accommodate the communication links within the network. The superframe must also meet the requirements for network/node information flow including both the amount and direction of information transferred. Since packets are transferred from node to node within the superframe structure, the overall information flow must be considered when assigning cells within the superframe. It would be useful to be able to assign a superframe of a digraph network where the assignment would specify the superframe and assign its cells to meet information flow requirements of the digraph network.

BRIEF DESCRIPTION OF THE DRAWINGS

Various embodiments of the invention are disclosed in the following detailed description and the accompanying drawings.

FIGS. 1A, 1B and 1C illustrate embodiments of different kinds of graphs.

FIG. 2 illustrates an embodiment of the relationship of communication packets, time slots, and superframe cycles.

FIGS. 3A and 3B illustrate embodiments of the interrelationship of a digraph and a superframe.

FIG. 4 illustrates an embodiment of links between intelligent nodes hopping across channels in different cycles.

FIGS. 9A, 9B, and 9C illustrate embodiments of a diagram of a digraph of a simple star-connected network that shows two different implementations of that digraph, one in a superframe with nine slots on a single channel (FIG. 9B) and one with twelve slots on three channels (FIG. 9C), respectively.

FIGS. 10A and 10B illustrate embodiments of a digraph associated with a linear network and an implementation of that digraph in a superframe with 12 slots in three channels.

FIG. 10D illustrates an embodiment of a superframe corresponding to the digraph network of FIG. 10C.

FIG. 10E illustrates an embodiment of a superframe corresponding to the digraph network of FIG. 10C.

FIG. 10G illustrates an embodiment of a superframe corresponding to the digraph network of FIG. 10F.

FIG. 10I illustrates an embodiment of a superframe corresponding to the digraph network of FIG. 10H.

FIG. 10K illustrates an embodiment of a superframe corresponding to the digraph network of FIG. 10J.

DETAILED DESCRIPTION

Figure 5A:
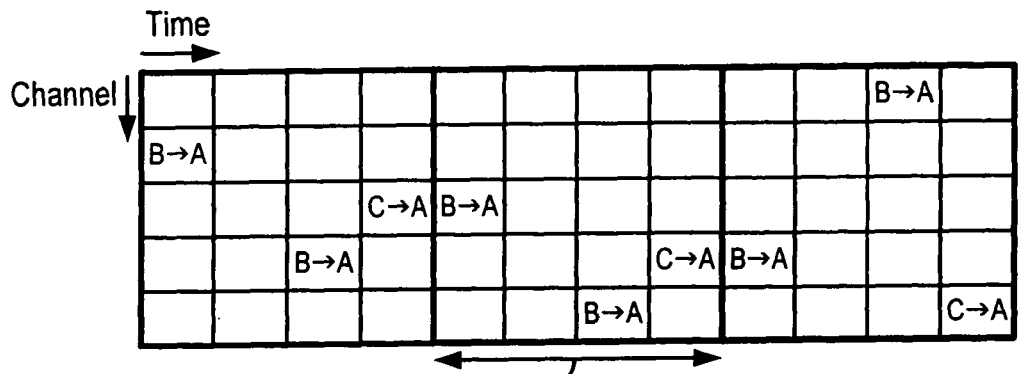
FIGS. 5A, 5B and 5C illustrate embodiments of two digraphs running on the same network of intelligent nodes with their associated superframes.

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

An assignment of cells in a superframe using digraph link information in a network of nodes is disclosed. The assignment includes determining a total number of digraph links in the network of nodes. A digraph link is a directional link specifying routing information at each node in the network between one node and another node. A digraph-linked network of nodes includes a plurality of nodes each with a plurality of digraph links. The assignment includes selecting a superframe size at least large enough to accommodate the total number of digraph links desired in the superframe and assigning each digraph link to a cell in the superframe. Each cell in the superframe specifies a synchronized time and frequency communication plan.

Digraph networks employ intelligent nodes comprising a transmitter and receiver, a power source, input devices, sometimes output devices, and an intelligent controller, such as a programmable microprocessor controller with memory. In the past, networks, such as the internet, have been developed having configurations or networks for communication that are static, dynamic or a hybrid of static and dynamic. Power for these networks has been most often supplied via wires (the nodes are "plugged in") or occasionally from batteries. As the size, power, and cost of the computation and communication requirements of these devices has decreased over time, battery powered wireless systems have gotten smaller and smaller and more prevalent. The limit to size scaling resulting from this trend to smaller and lower power wireless devices is in the millimeter size range, leading to predictions of "smart dust". For this reason, the research community has adopted the name mote to refer to a small wireless sensor device. Mote is an old English word meaning a speck of dust.

A self-contained unit of communication information is called a packet. A packet has a header, a payload and an optional trailer (FIG. 2). A link is a path which originates at exactly one node and terminates at exactly one other node. A node is thus any vertex or intersection in a communication network. A node may be passive or intelligent. A node is assumed to be an intelligent node in that it is capable of receiving and analyzing information, taking certain actions as a result of received information, including the storing of received or processed information, modifying at least part of received information, and in some instances originating and retransmitting information.

In ATM systems, a cell is a channel-specific time period of fixed duration during which a unit of communication occurs between two fixed terminals without conflict. By comparison, as used herein, a slot refers to a time period during which a packet can be sent as well as acknowledged, and a cell refers to a particular slot and radio channel offset in a superframe (defined below). In conventional TDMA systems, such as defined by the DS-1 (T-1) standard, a frame is a period of time of defined and fixed duration. By contrast, a superframe is an arbitrary number of slots and thus can be of variable duration. A superframe is iterated each cycle, as hereinafter explained.

Communication between intelligent nodes occurs only at specific times and on specific channels. Each intelligent node in a network represents its connectivity to other intelligent nodes in the network as a collection of directed links on one or more digraphs. Each superframe repeats in a continuous sequence of cycles. Each link can be used for the transmission and optional acknowledgement of a single packet. Thus, in a given superframe, the available bandwidth from intelligent node A to intelligent node B (in packets per second) is the product of the number of links from A to B in the superframe (links per cycle) and the superframe rate (cycles per second). For example, if there were 1 link from intelligent node A to intelligent node B in superframe S, and superframe S consisted of 100 slots of duration 50 ms per slot, then the length of a single cycle of superframe S would be five seconds (100×0.05=5), and the superframe rate would be 0.2 cycles/second. With one available link per frame, intelligent node A would be able to send at most one packet to intelligent node B every five seconds. In the same superframe, intelligent node B might have ten links to intelligent node A, giving B ten times the bandwidth to A as A has to B. In a separate superframe F with 10 slots of length 50 ms, intelligent node A might have five links to intelligent node C, giving an available bandwidth of 10 packets per second (1 packet/link*5 links/cycle*2 cycles/second).

The ability to create multiple superframes of different lengths, and assign different numbers of links between intelligent nodes in each superframe provides flexibility to the network designer. This flexibility allows bandwidth, redundancy, latency, and many other network performance parameters to be traded off against power consumption.

There is a one to one correspondence between digraphs or networks and superframes. Digraphs are the abstract representation of a superframe, and they allow designers to look at and design collections of links and understand their function. Each link in a digraph is assigned a cell, that is, a particular time slot offset and channel offset, in the corresponding superframe. In each cycle of the superframe, these two offsets are used together with the cycle number to calculate the exact time and frequency on which the intelligent node is to turn on its radio.

Referring to FIG. 1A, a graph is defined a collection of vertices or intelligent nodes with connections, or links, between the intelligent nodes. Referring to FIG. 1B, a digraph is defined as a graph where all of the links have an associated direction, so that a digraph connects a plurality of intelligent nodes in a network with links defining direction of flow. Referring to FIG. 1C, a multi-digraph is defined as a digraph in which there exists at least one pair of links which both originate at the same originating intelligent node and terminate on the same terminating intelligent node. It is possible to have multiple multi-digraphs, if there is a first multi-digraph in which each link is labeled "1", and a second multi-digraph in which each link is labeled "2", and one or more of the intelligent nodes in the first graph is also in the second graph, then this is an example of multiple multi-digraphs.

Herein the concept of digraph-based packet transport is introduced. Digraph based packet transport is analogous to water flowing in a river delta with its meandering branches. If a number of intelligent entities each in an independent unpropelled watercraft were dropped all over the delta with no means of guidance except to choose a path at each fork, they would take a wide variety of paths, depending on flow and congestion. Eventually, all would arrive at the basin. Two that started far apart might end up close together, and two that started near each other might take completely different paths and arrive at different times.

In a packet communication network, a method and apparatus for packet switched transport is provided among intelligent nodes wherein the duty cycling of the intelligent nodes is minimized in order to maximize power life using a synchronization algorithm that assures all nodes are able to propagate information through the network without undue use of transmission and reception power. Frequency hopping time-division multiple access supports packet communication between intelligent nodes via assigned directed links, each link being assigned to a time-channel offset (cell) in a superframe, so that a link carrying a packet string between any two intelligent nodes is active only during its assigned time slot. The result is efficient use of spectrum and minimal expenditure of power. If multiple superframes are employed and all frequency slots are simultaneously operating in synchronicity, the spectrum has the potential for 100% data utilization, less guard band spectrum.

In a sensor network, the vertices of a graph, representing the topology of the network, are the sites of intelligent nodes, also designated "motes," either physical or symbolic, which are capable of analyzing incoming traffic and sensory data and which can act upon the traffic, reroute traffic and originate information from the site. Directed links (101 FIG. 1B) between intelligent nodes A, B, C, and G represent communication slots, and multiple links or slots (FIG. 1C) provide a mechanism for exhibiting relative available bandwidth between intelligent nodes. Every directed link in a digraph has the capability of transporting one packet in a given communication slot (FIG. 2). Each of these slots has a fixed length and admits the construction of a superframe (FIG. 2) which defines how the links in a given digraph will be distributed in time and frequency.

Referring to FIG. 2, a slot is a period of time in a superframe (which consists of N slots) during which a packet may be sent and (optionally) acknowledged. Slots herein have a uniform, fixed duration, and therefore packets carried in any slot have a corresponding maximum data payload size within the constraints of the standard slot.

Superframes repeat, and each repetition is called a communication cycle, or simply a cycle. All intelligent nodes in a defined network share the same synchronized view of the occurrences of the edges of slots. Intelligent nodes may participate in multiple graphs/superframes and therefore communicate with other intelligent nodes at very different rates and with different latencies. There may be no single superframe which has slots that contains the traffic of all intelligent nodes in the network.

All intelligent nodes within a network, whether digraph-based or tree or conventional mesh, have a shared sense of time, synchronized to within about one millisecond (see below). In operation (FIG. 3A), if intelligent node B is transmitting to intelligent node A in time slot I (111, FIG. 3B), intelligent node A can therefore expect the transmission to occur within a few milliseconds of the beginning of slot I 111 during each cycle. If the header of the message has not been received within a few milliseconds of the beginning of slot I, (114, FIG. 2), intelligent node A will turn off its receiver (go to sleep) assuming that intelligent node B had nothing to send at that particular time. The result is that redundant receive links can be used in a network with a power penalty of roughly one tenth of the cost of a link that is used. Thus, if intelligent node B in general needs to send p number of packets per cycle to intelligent node A, there can be for example 3*p links dedicated to this task, of which only one third will typically be used. The unused links cost the transmitter no power at all (if the transmitter has no packets to send, as it will not turn on its output stage). The unused links cost the potential receiver much less than an active link, since the receiver need only be on for a fraction of the slot length as needed to detect whether a message is incoming. This 200% redundancy in links costs approximately 20% in additional power consumption, but it provides for a dramatic increase in the reliability of a network.

The duration of the "acceptable header start time" depends on the accuracy of clock synchronization (in parts per million) among intelligent nodes, as well as the length of delays between exchanges of packets and acknowledgment packets. Taken together, these parameters relate network latency, battery life and the superframe rate, or "chattiness" of the network.

Time clocks drift with temperature. For a reasonably simple temperature compensation scheme, the intelligent nodes are expected to a shared time base that is off by no more than a few tens of parts per million (PPM). For a 100 second long superframe, that corresponds to a few milliseconds of error after one cycle of a superframe. If longer time periods for superframe length are desired (i.e. less communication chatter) then either the listening time must be increased, with corresponding power increase, or the clock drift must be reduced.

FIG. 3A illustrates the implementation a digraph through selection of slots in a time/frequency (slot/channel) plane of a superframe (FIG. 3B). Time (x-axis) is divided into slots, and frequency (y-axis) is divided into channels, for example in the ISM band from 902.5 MHZ to 927.5 MHz in 500 kHz increments. Thus, each link in the graph has a corresponding time/frequency bucket, or slot, in time/frequency space.

An example of channel (frequency) assignment of three links in the multi-digraph is shown in FIG. 3B. Typical implementations would use pseudo-random and potentially time-varying channel/frequency mapping. In time order, the slot assignments are {1, 2} for B->A #1; {3,4} for B->A #2, and {5,3} for C->A, which slots are then repeated each cycle.

Multiple cycles of a sample superframe, as shown in FIG. 4, illustrate how the communication channel changes each cycle. To maximize immunity to narrowband interference, the communication channel of the slot to which a link is assigned is offset by one channel each superframe. As shown in FIG. 4, each cycle the actual communication channel is incremented by one (modulo of the number of channels). In this way, every link in a network is effectively implemented over a pseudo-random sequence of frequencies. For some networks, this pseudo-random variation in frequency can also be applied to the time slot for the communication. In a variation, both ends of a digraph link can be informed as to the future slot usage of a superframe through appropriate identification and authentication, such as ID, password, etc., so that the communication can be effected without reliance on a predetermined slot pattern. As a further extension, the ends can identify to each other a selected one of a choice of slot usage patterns over future superframes.

Figure 5B:
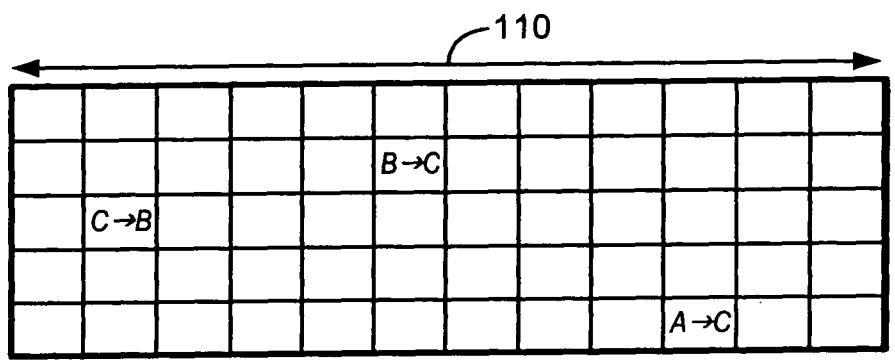
Figure 5C:
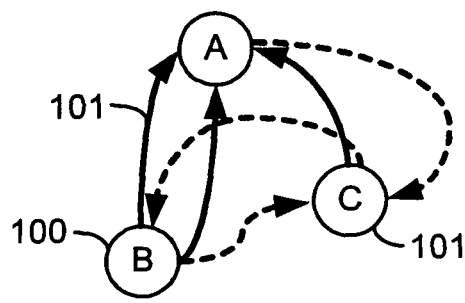

FIGS. 5A and 5B are diagrams illustrating two digraphs (FIG. 5C) running on the same network of intelligent nodes, with examples of what the superframe associated with each digraph might be. Herein the respective digraphs, herein labeled solid line and dashed line, corresponding to plain font and dashed line corresponding to bold italicized font, may be implemented on either identical or of independent sets of channels without causing interference with each other.

Figure 6:
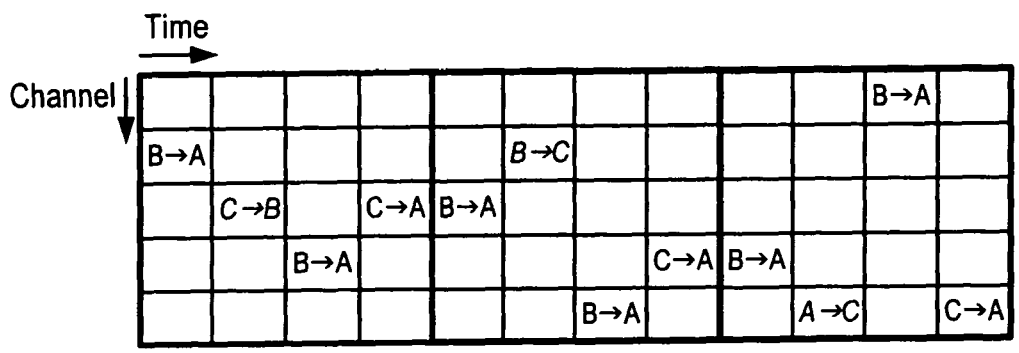
FIG. 6 illustrates an embodiment of the resulting combined link activity for the intelligent nodes in FIG. 5.

FIG. 6 illustrates how these two superframes share spectrum. By careful choice of superframe length and time slots, there is never a time-slot collision between the two superframes. The timeslots used by one superframe are blocked with respect to the other superframe. The two different digraphs in a network need not be implemented with the same transmission rate. As illustrated in FIG. 5B, by using a different length frame for the second digraph, in this case a subharmonic of the first digraph, links in the first digraph appear with three times the frequency of the links in the second digraph. Superframes are inherently composed of an integral number of slots, but they need not be integer multiples of each other in length. However, as in FIG. 6, by choosing the second superframe length to be an integer multiple of the first superframe length, it is possible to guarantee that there will be no collisions between the two superframes. Alternatively, using superframe lengths that are prime numbers will ensure that time-slot collisions, when they do occur, are evenly distributed among links.

A relatively a large number of links may be implemented. For an embodiment with 50 channels and a 30 ms slot length, there are over 1500 slot/channel pairs available per second, with room for guard band and guard times.

In any network type, each intelligent node must store its own collection of links. The information that an intelligent node must store to completely characterize a link is about 20 bytes long (superframe ID, slot, channel, partner, link type, etc.). This allows an intelligent node to store roughly 50 links/KB of RAM.

The representation and synchronization of time in a sensor network is essential if the network is synchronous and if energy is to be conserved. In a specific embodiment, all intelligent nodes are assumed to have a 32 kHz crystal oscillator, as typically found in a watch, as a time reference. Low-cost watch crystals are advantageous because of their low power consumption (sub-microwatt), but they are known to have substantial variation in frequency in both their manufacturing tolerance, as well as their temperature dependence. One simple representation of the actual oscillation frequency of a crystal oscillator is given by:

$$F_{osc} = F_{nom} \cdot (1 + \text{alpha}(T - T_{nom} + T_{off})^2 + PPM_{off} + PPM_{drift})$$

where $F_{nom}$ is 32,768 Hz, $T_{nom}$ is 25 degrees C., and alpha is typically 0.0035+/−0.0005 ppm/K², $T_{off}$ is +/−5K, $PPM_{off}$ is +/−20 PPM, and $PPM_{drift}$ is +/−3 PPM in the first year.

Taken together, these offsets and temperature dependencies generate a worst case of up to 200 PPM difference in crystal oscillation rate between two intelligent nodes under industrial temperature conditions. Even at room temperature, the difference can be almost 50 PPM. This implies that, without compensation, two intelligent nodes which synchronize their clocks at time $t_0$ could be off by as much as 12 ms one minute later, or 17 seconds after a day.

The majority of the error in clock rate is due to the quadratic dependence of frequency on temperature. The room-temperature frequency offset, $PPM_{off}$, as well as the quadratic coefficient, alpha, and the temperature peak offset, $T_{off}$, can all be measured at the time of manufacture, and a calibration table can be created which represents the difference between the actual frequency of the oscillator and the desired frequency of the oscillator. It is difficult to directly adjust the frequency of the crystal based on this knowledge, but it is relatively straightforward to adjust the digital counter which is incremented each cycle of the crystal.

Figure 7A:
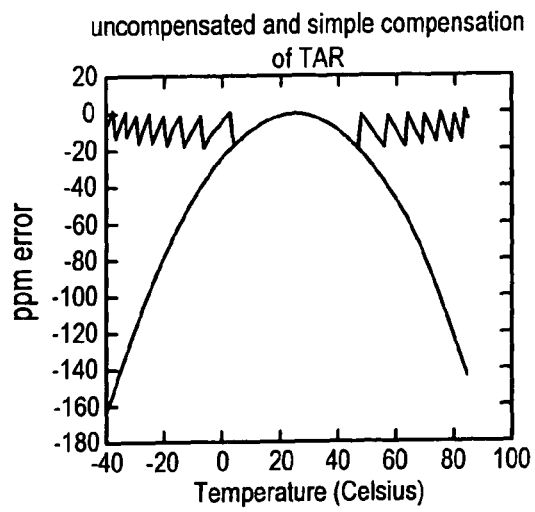
FIG. 7A illustrates an embodiment of the theoretical relationship between crystal frequency error and temperature, before and after temperature compensation.

FIG. 7A is a graph of the simulated preliminary results of temperature compensation of the 32 kHz clock. The uncompensated crystal (smooth parabolic curve) has over 160 PPM error at low temperature. Compensating for the slow crystal by adding additional ticks with a frequency dependent on the measured temperature yields the jagged line.

Figure 7B:
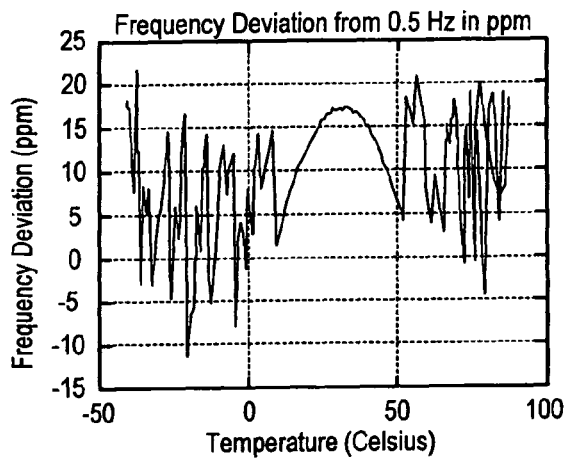
FIG. 7B illustrates an embodiment of the actual measured frequency deviation versus temperature for crystal compensated.

FIG. 7B is the actual preliminary results of temperature compensation of the 32 kHz clock. Measured data remains within roughly 20 PPM of zero error over the range −40 deg. C. to +85 deg. C. Because all crystals have slightly different parameters, it is likely that each intelligent node will need to be calibrated at the time of manufacture. This can be done either via a physical connection or an RF communication link. Intelligent nodes are placed in a temperature-controlled environment, informed of the ambient temperature, and given a time reference of some kind, such as a series of synchronizing packets via the RF link from a master controller. Based on this time and temperature reference, the intelligent nodes are expected to determine various calibration compensation parameters and to perform the corresponding compensations.

The calibration can be performed as follows: A simple method is to use table-lookup mapping technique to relate temperature to the appropriate delay for an extra "tick" of the 32 kHz clock. For example, if calibration determines that, at 0 deg. C., the clock is slow by 50 PPM, then every 20,000 ticks (the reciprocal of 50 PPM) a one tick adjustment is added.

Figure 8:
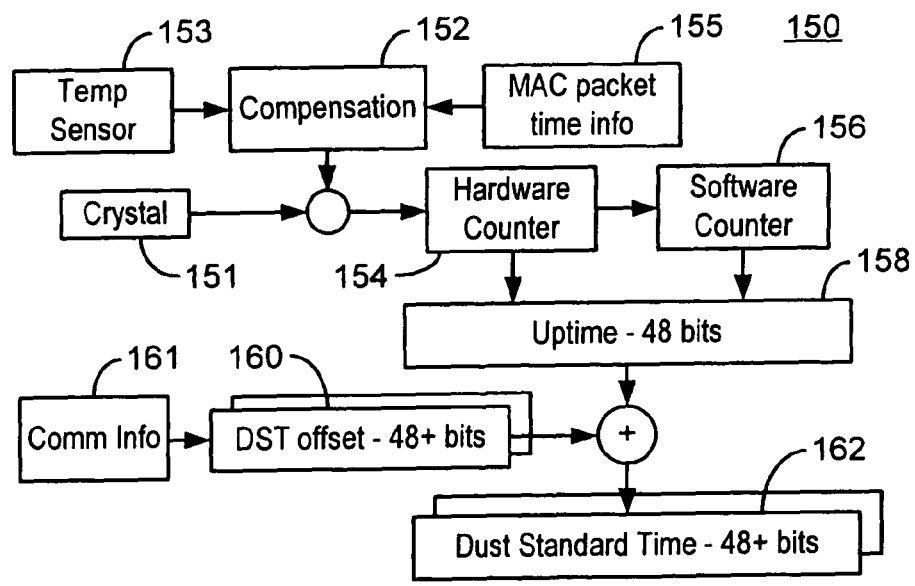
FIG. 8 illustrates an embodiment of an on-board clock of the intelligent nodes.

A block diagram of a circuit 150 that illustrate this approach to calibration is shown in FIG. 8. A 32 kHz oscillator (crystal 151) provides the reference, which is corrected for temperature by a temperature sensor 153, for timing drift by a MAC layer packet timing information compensator 155, as well as for manufacturing offset, by a compensation circuit 152 that adds occasional ticks. This drives a hardware counter 154 that counts ticks directly, optionally augmented by a software counter 156 (e.g., via interrupts generated when the hardware counter rolls over). This counter setup represents the intelligent node's best guess at how long it has been awake since last reboot. Each intelligent node maintains a 48-bit counter 158 which represents time since its last reboot, or uptime. Uptime is guaranteed monotonic (non-decreasing), and it is used for on-intelligent node timing of events.

In addition to uptime, each intelligent node maintains a local standard time offset 160, which is an estimate of the difference between its internal clock (uptime 158) and a global network standard, herein Dust Standard Time (DST) 162. DST is zero at midnight on Jan. 1, 2003. The DST offset 160 value is subject to modification from a communication information corrector 161 that derives correction information from the MAC layer. The DST offset 160 value is added to uptime value to generate the intelligent node's best guess at the DST 162 value, with correction. The DST value is used to schedule network events, such as communication with other intelligent nodes and for sampling of sensors. If an intelligent node is a part of multiple networks or has multiple parents or gateways, the DST offset for each can be stored separately. Time synchronization across the network is achieved by exchanging timing information in every link.

Groups of crystals manifest a natural distribution above and below their rated frequency, and only those which are slow can be sped up to the nominal frequency, leaving the other crystals to run fast. One solution to this problem is to speed all crystals up to a speed that is faster than the nominal crystal frequency.

For a given digraph, or communication flow, there are many different superframe implementations. FIG. 9A represents a simple star-connected network in which three intelligent nodes communicate directly with a fourth gateway intelligent node. The digraph in FIG. 9A shows that there should be two "inward" links from each intelligent node to the gateway, and one "outward" link from the gateway to each mote, giving 9 links total. These nine links must be assigned to cells in a superframe. By picking a superframe with 9 time slots and a single channel offset, each of these links can be assigned to a separate cell in the superframe. This assignment is not unique, but an example assignment is shown in FIG. 9B. In the link assignment illustrated in 9B, intelligent node A has two opportunities to send a packet to intelligent node G at the beginning of each cycle, and then no more opportunities to send a packet for the rest of the cycle. By picking a superframe with 12 time slots and 3 channel offsets there are many more options for assigning the nine links to 36 cells. One such assignment is shown in FIG. 9C. These diagrams thus illustrate the efficiency of spectrum and time usage and suggest how links can be ordered in order to be optimized.

FIG. 10A and FIG. 10B are together an example of a digraph associated with a linear network and an example implementation of that digraph in a superframe with 12 slots. The similarities and differences with the example of FIGS. 9A-C will be evident.

Figure 10C:
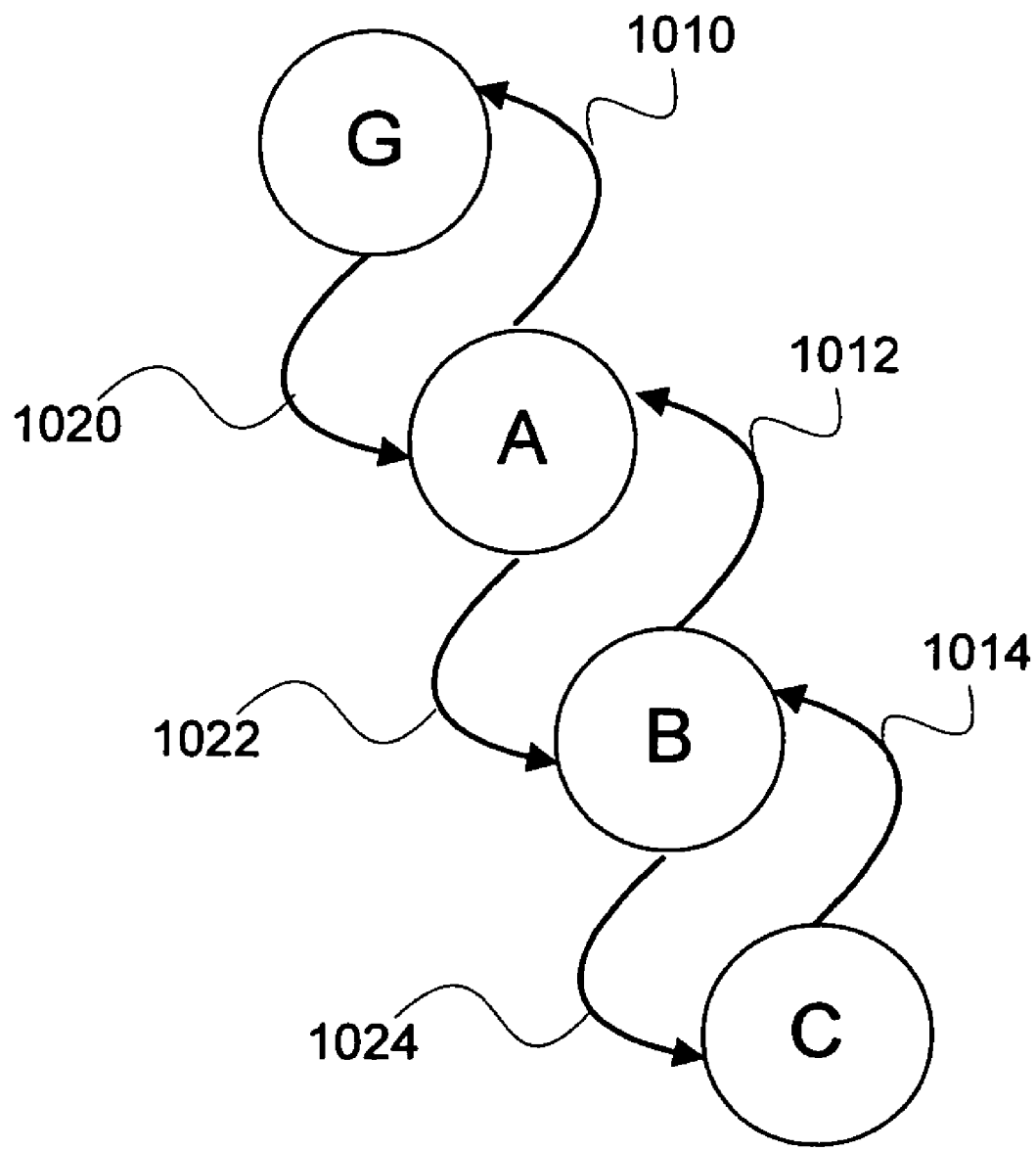
FIG. 10C illustrates an embodiment of a digraph network.

FIG. 10C illustrates an embodiment of a digraph network. In the example illustrated, nodes are connected to each other with directional communication links. The links indicate the direction of transmission of packets. There is communication in the opposite direction of the link in order to acknowledge, or not acknowledge, the proper receipt of a packet after it has been transmitted. Gateway node G is linked by link 1020 to node A. Node A is linked by link 1022 to node B. Node B is linked by link 1024 to node C. Node C is linked by link 1014 to node B. Node B is linked by link 1012 to node A. Node A is linked by link 1010 to gateway node G. In some embodiments, a gateway node is a node connected to a different type of network. In some embodiments, a gateway is also referred to as an exfiltration point. In some embodiments, the different type of network is a wired network or a different type of wireless network. In some embodiments, the different type of network is a local area network (LAN), a wide area network (WAN), or the internet.

FIG. 10D illustrates an embodiment of a superframe corresponding to the digraph network of FIG. 10C. In the example illustrated, a superframe containing three channels is shown: channel 0 (Ch 0), channel 1 (Ch 1), and channel 2 (Ch 2). The superframe also contains six time slots: slot 0 (S0), slot 1 (S1), slot 2 (S2), slot 3 (S3), slot 4 (S4), and slot 5 (S5). A superframe is a structure containing frequency channels and time slots. The superframe is selected to be at least large enough to accommodate the total number of digraph links desired in the superframe. The superframe accommodates digraph links by assigning a digraph link to a cell in the superframe. In some embodiments, a digraph link is assigned to a cell considering other links in the same time slot so that there are no conflicts between the links in the same time slot. For example, a node is not both transmitting and receiving in the same slot. In various embodiments, the total number of links desired in the superframe is all of the links in the digraph network or a subset of the links in the digraph network. The superframe indicates a communication schedule for which nodes communicate within a given frequency channel and a given time slot. In some embodiments, the channels correspond to frequency subbands within a band of frequencies within which the radio transmitter and receiver are capable of operating. In some embodiments, the frequency subbands are within a given industrial, scientific, and medical (ISM) radio band. For example, the subbands can be a 500 kHz subband between 902.5 MHz and 927.5 MHz. In some embodiments, the assignment of channels to frequency subbands varies as a function of time. In some embodiments, the time slots correspond to the time window to allow a fixed packet to be sent and for the receiver to be able to acknowledge, or not acknowledge, a packet's correct transmission.

In the example illustrated in FIG. 10D, in Ch 0-S0 cell, node C sends to node B. In Ch 1-S1 cell, node B sends to node A. In Ch 2-S2 cell, node A sends to node G. This superframe is optimized for a packet to travel from one end of the digraph network to the other end of the digraph network. In this example, the superframe optimization involves assigning the cells so that packets propagate from one end of the network to the other in an efficient manner (so that time latency is reduced as compared to other superframe arrangements i.e. a random arrangement) and also so that a given node is only transmitting or receiving from one other node. There are many possible cell assignments and that different optimizations can be achieved. In this example, the packet travels from the farthest downstream node C to the farthest upstream (gateway) node G. If a given packet is the top priority in each queue for nodes C, B, and A, the packet reaches node G from node C in three time slots. A packet has top priority in a queue for a given node if the packet is prioritized to be sent at the next available time slot.

In the example illustrated in FIG. 10D, in Ch 0-S3 cell, node G sends to node A. In Ch 1-S4 cell, node A sends to node B. In Ch 2-S5 cell, node B sends to node C. This superframe is optimized for a packet to travel from one end of the digraph network to the other end of the digraph network. In this example, the superframe optimization involves assigning the cells so that packets propagate from one end of the network to the other in an efficient manner (so that time latency is reduced as compared to other superframe arrangements i.e. a random arrangement) and also so that a given node is only transmitting or receiving from one other node. There are many possible cell assignments and that different optimizations can be achieved. In this example, the packet travels from the farthest upstream (gateway) node G to the farthest downstream node C. If a given packet is the top priority in each queue for nodes G, A, and B, the packet reaches node C from node G in three time slots.

FIG. 10E illustrates an embodiment of a superframe corresponding to the digraph network of FIG. 10C. In the example illustrated, a superframe containing three channels is shown: channel 0 (Ch 0), channel 1 (Ch 1), and channel 2 (Ch 2). The superframe also contains six time slots: slot 0 (S0), slot 1 (S1), slot 2 (S2), slot 3 (S3), slot 4 (S4), and slot 5 (S5). A superframe is a structure containing frequency channels and time slots. The superframe is selected to be at least large enough to accommodate the total number of digraph links desired in the superframe. The superframe accommodates digraph links by assigning a digraph link to a cell in the superframe. In some embodiments, a digraph link is assigned to a cell considering other links in the same time slot so that there are no conflicts between the links in the same time slot. For example, a node is not both transmitting and receiving in the same slot. In various embodiments, the total number of links desired in the superframe is all of the links in the digraph network or a subset of the links in the digraph network. In the example illustrated in FIG. 10E, in Ch 0-S0 cell, node C sends to node B. In Ch 0-S1 cell, node B sends to node C. In Ch 1-S2 cell, node A sends to node G. In Ch 1-S3 cell, node G sends to node A. In Ch 2-S4 cell, node B sends to node A. In Ch 2-S5 cell, node A sends to node B. This superframe is not optimized for a packet to travel from one end of the digraph network to the other end of the digraph network. In this example, the packet travels from the farthest downstream node C to the farthest upstream (gateway) node G. If a given packet is the top priority in each queue for nodes C, B, and A, the packet reaches node G from node A in nine time slots; in S0 the packet travels from C to B, then in S4 the packet travels from B to A, and finally, in the next S2, the packet travels from A to G.

In this example, the packet travels from the farthest upstream (gateway) node G to the farthest downstream node C. If a given packet is the top priority in each queue for nodes G, A, and B, the packet reaches node C from node G in five time slots; in S3 the packet travels from G to A, then in S5 the packet travels from A to B, and finally, in the next S1, the packet travels from B to C. This superframe is optimized for neighbor communication. Communication between neighboring nodes is organized so that in both directions between the neighbors occurs within two time slots. In some embodiments, the optimization for neighbor communication is used for feedback or control loops in the network.

Figure 10F:
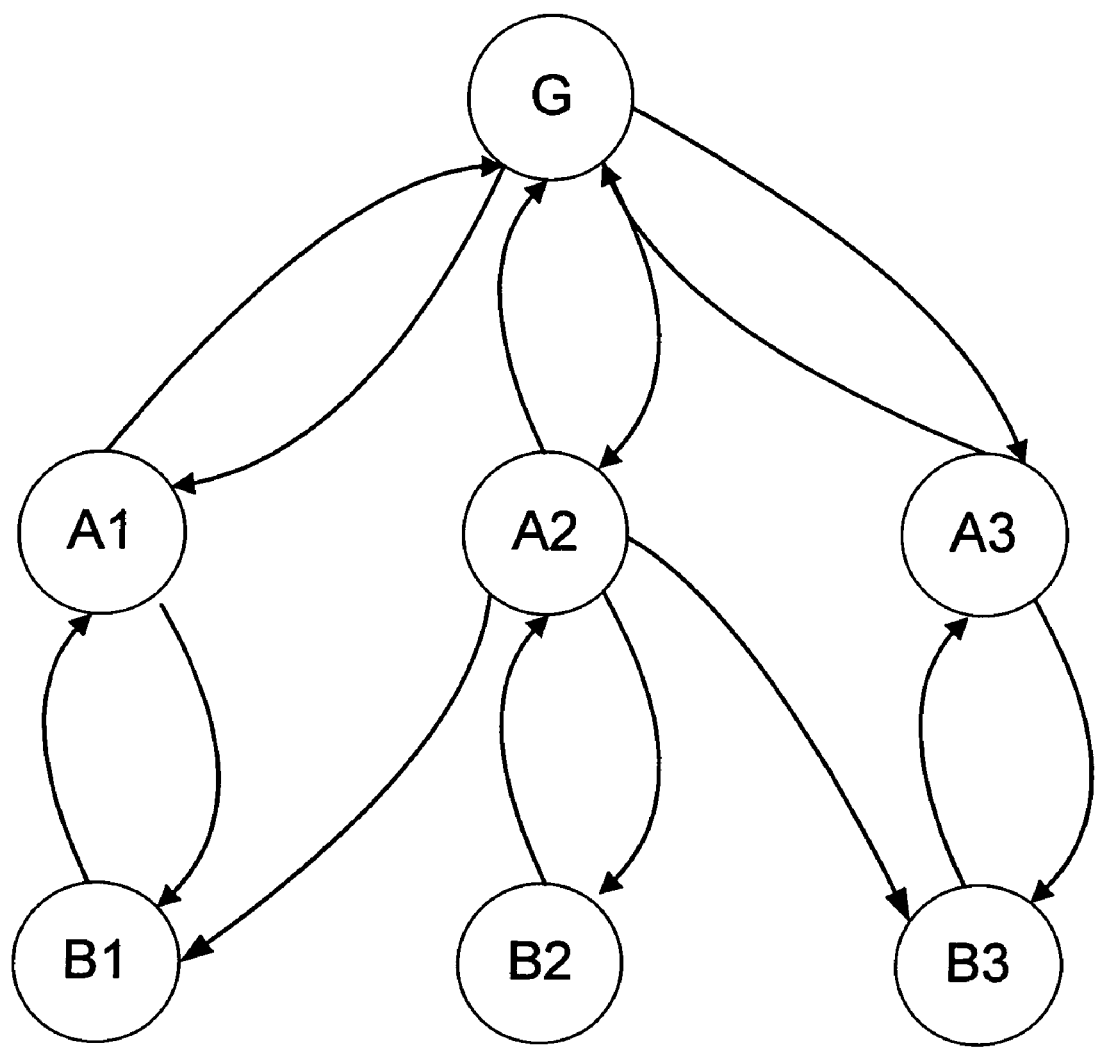
FIG. 10F illustrates an embodiment of a digraph network.

FIG. 10F illustrates an embodiment of a digraph network. In the example illustrated, nodes are connected to each other with directional communication links. The links indicate the direction of transmission of packets. There is communication in the opposite direction of the link in order to acknowledge, or not acknowledge, the proper receipt of a packet after it has been transmitted. Gateway node G is linked to node A1, node A2, and node A3. Node A1 is linked to node G and to node B1. Node A2 is linked to node G, node B1, node B2, and node B3. Node A3 is linked to node G and node B3. Node B1 is linked to node A1. Node B2 is linked to node A2. Node B3 is linked to node A3.

FIG. 10G illustrates an embodiment of a superframe corresponding to the digraph network of FIG. 10F. In the example illustrated, a superframe containing three channels is shown: channel 0 (Ch 0), channel 1 (Ch 1), and channel 2 (Ch 2). The superframe also contains six time slots: slot 0 (S0), slot 1 (S1), slot 2 (S2), slot 3 (S3), slot 4 (S4), and slot 5 (S5). A superframe is a structure containing frequency channels and time slots. The superframe is selected to be at least large enough to accommodate the total number of digraph links desired in the superframe. The superframe accommodates digraph links by assigning a digraph link to a cell in the superframe. In some embodiments, a digraph link is assigned to a cell considering other links in the same time slot so that there are no conflicts between the links in the same time slot. For example, a node is not both transmitting and receiving in the same slot. In various embodiments, the total number of links desired in the superframe is all of the links in the digraph network or a subset of the links in the digraph network. In the example illustrated in FIG. 10G, in Ch 0-S0 cell, node B1 sends to node A1. In Ch 2-S0 cell, node A3 sends to node B3. In Ch 0-S1 cell, node A1 sends to node G. In Ch 1-S1 cell, node B2 sends to node A2. In Ch 0-S2 cell, node A1 sends to node B1. In Ch 1-S2 cell, node A2 sends to node G. In Ch 2-S2 cell, node B3 sends to node A3. In Ch 1-S3 cell, node A2 sends to node B2. In Ch 2-S3 cell, node A3 sends to node G. In Ch 0-S4 cell, node G sends to nodes A1, A2, and A3. In Ch 1-S5 cell, node A2 sends to nodes B1, B2, and B3.

The superframe illustrated in FIG. 10G is optimized for a packet to travel from one end of the digraph network to the other end of the digraph network. In this example, the superframe optimization involves assigning the cells so that packets propagate from one end of the network to the other in an efficient manner and also so that a given node is only transmitting or receiving from one other node. There are many possible cell assignments and that different optimizations can be achieved. In this example, the packet travels from the farthest downstream node B1, B2, or B3 to the farthest upstream (gateway) node G. If a given packet is the top priority in each queue for nodes B1, B2, B3, A1, A2, and A3, the packet reaches node G from nodes B1, B2, or B3 in two time slots; for example, in S0 a packet travels from B1 to A1, then in S1 the packet travels from A1 to G.

Similarly the superframe illustrated in FIG. 10G is also optimized for travel in the other direction. In this example, the superframe optimization involves assigning the cells so that packets propagate from one end of the network to the other in an efficient manner and also so that a given node is only transmitting or receiving from one other node. There are many possible cell assignments and that different optimizations can be achieved. In this example, the packet travels from the farthest upstream (gateway) node G to the farthest downstream node B1, B2, or B3. If a given packet is the top priority in each queue for nodes G, A1, A2, and A3, the packet reaches nodes B1, B2, or B3 from node G in two time slots; for example, in S4 a packet travels from G to A2, then in S5 the packet travels from A2 to B1, B2, and B3. In this example, the superframe has two cells (Ch 0-S4 and Ch 1-S5) that multicast the packet communication. A multicast is a packet communication from one transmitting node to multiple receiving nodes. In some embodiments, multicast packet communication does not include having the receiver acknowledge the reception of a transmission.

Figure 10H:
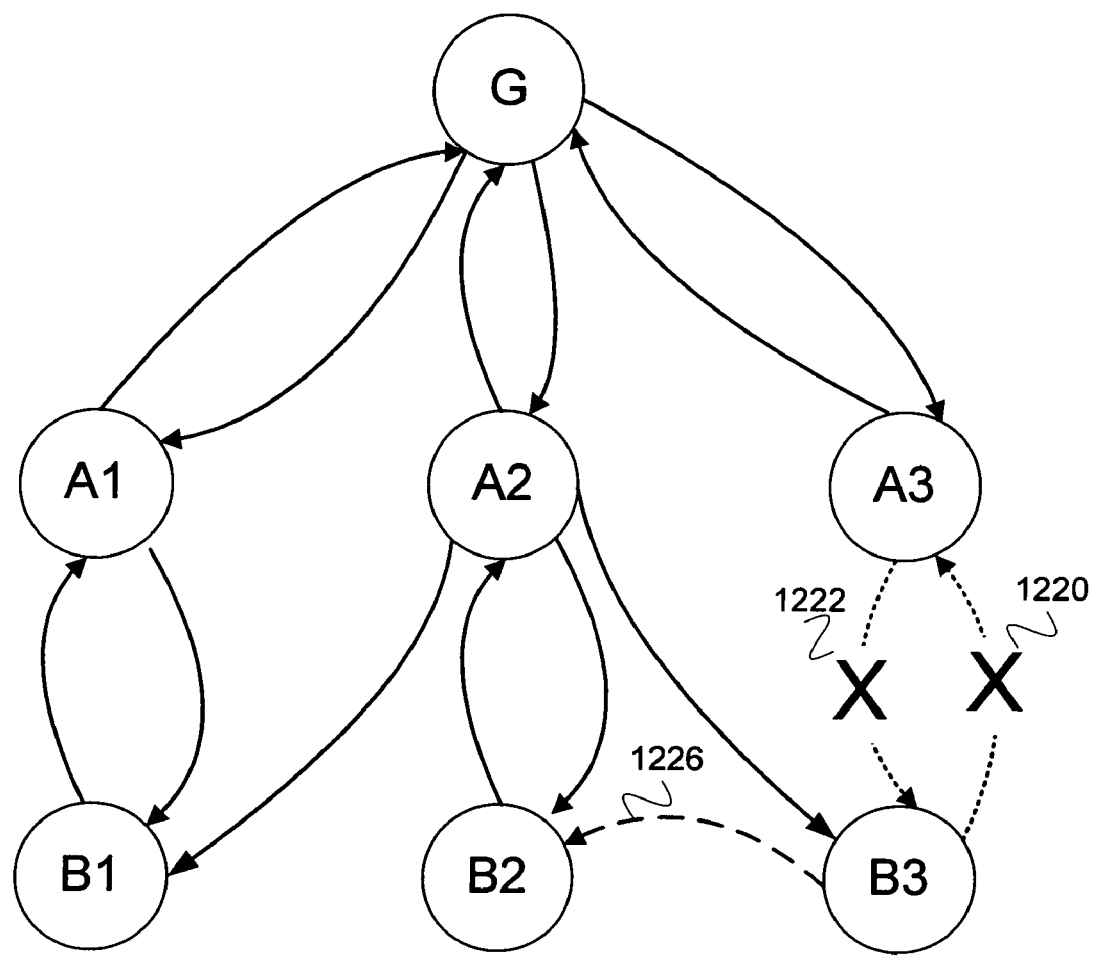
FIG. 10H illustrates an embodiment of a digraph network.

FIG. 10H illustrates an embodiment of a digraph network. In the example illustrated, nodes are connected to each other with directional communication links. The links indicate the direction of transmission of packets. There is communication in the opposite direction of the link in order to acknowledge, or not acknowledge, the proper receipt of a packet after it has been transmitted. Gateway node G is linked to node A1, node A2, and node A3. Node A1 is linked to node G and to node B1. Node A2 is linked to node G, node B1, node B2, and node B3. Node A3 is linked to node G (and not to node B3 through link 1222). Node B1 is linked to node A1. Node B2 is linked to node A2. Node B3 is linked to node B2 through link 1226 (and not to node A3 through link 1220).

In some embodiments, if communication along a pair of links is no longer possible or desired, then an alternative link can be established by the network for the new requirements that are based on what is possible or desired. For example, if links 1220 and 1222 are no longer possible because of reception or transmission interference or signal strength problems (perhaps due to resource availability issues), then the network can switch to an alternate digraph/superframe. In the alternate digraph/superframe, the assignment of links in the digraph and cells in the superframe are made to accommodate the new requirements. In some embodiments, the resource is power. In some embodiments, the alternative network links are desirable because the communication frequency between nodes requires change.

In some embodiments, a change of state alters the requirements of the network so that an alternate network linking is desirable. In some embodiments, the change of state is a change of network state, a user requested change of state, a change of state stemming from the health reports of the resources states of the network, a change of state from information from upstream (from the gateway end) in the network, a change of state from information from downstream (from the end of the network the farthest from the gateway) in the network, or a change of state from information in a packet. In some embodiments, the alternate digraph/superframe is already preprogrammed in the network and can be utilized by specifying a new digraph/superframe for packet communications. In some embodiments, the gateway node can alter an existing digraph/superframe for the network to alter the communication links.

FIG. 10I illustrates an embodiment of a superframe corresponding to the digraph network of FIG. 10H. A superframe is a structure containing frequency channels and time slots. The superframe is selected to be at least large enough to accommodate the total number of digraph links desired in the superframe. The superframe accommodates digraph links by assigning a digraph link to a cell in the superframe. In some embodiments, a digraph link is assigned to a cell considering other links in the same time slot so that there are no conflicts between the links in the same time slot. For example, a node is not both transmitting and receiving in the same slot. In various embodiments, the total number of links desired in the superframe is all of the links in the digraph network or a subset of the links in the digraph network. In the example illustrated, a superframe containing three channels is shown:

channel 0 (Ch 0), channel 1 (Ch 1), and channel 2 (Ch 2). The superframe also contains six time slots: slot 0 (S0), slot 1 (S1), slot 2 (S2), slot 3 (S3), slot 4 (S4), and slot 5 (S5). In the example illustrated in FIG. 10I, in Ch 0-S0 cell, node B1 sends to node A1. In Ch 2-S0 cell, node B3 sends to node B2. In Ch 0-S1 cell, node A1 sends to node G. In Ch 1-S1 cell, node B2 sends to node A2. In Ch 0-S2 cell, node A1 sends to node B1. In Ch 1-S2 cell, node A2 sends to node G. In Ch 2-S3 cell, node A3 sends to node G. In Ch 0-S4 cell, node G sends to nodes A1, A2, and A3. In Ch 1-S5 cell, node A2 sends to nodes B1, B2, and B3. This superframe is optimized for a packet to travel from one end of the digraph network to the other end of the digraph network. In this example, the superframe optimization involves assigning the cells so that packets propagate from one end of the network to the other in an efficient manner and also so that a given node is only transmitting or receiving from one other node. There are many possible cell assignments and that different optimizations can be achieved. In this example, the packet travels from the farthest downstream node B1, B2, or B3 to the farthest upstream (gateway) node G. If a given packet is the top priority in each queue for nodes B1, B2, B3, A1, A2, and A3, the packet reaches node G from nodes B1, B2, or B3 in two or three time slots; for example, in S0 a packet travels from B1 to A1, then in S1 the packet travels from A1 to G and in S0 a packet travels from B3 to B2, then in S1 from B2 to A2, and then in S2 from A2 to G. In some embodiments, multicast packet communication does not include having the receiver acknowledge the reception of a transmission.

The superframe illustrated in FIG. 10I is optimized for a packet to travel from one end of the digraph network to the other end of the digraph network. In this example, the superframe optimization involves assigning the cells so that packets propagate from one end of the network to the other in an efficient manner and also so that a given node is only transmitting or receiving from one other node. There are many possible cell assignments and that different optimizations can be achieved. In this example, the packet travels from the farthest upstream (gateway) node G to the farthest downstream node B1, B2, or B3. If a given packet is the top priority in each queue for nodes G, A1, A2, and A3, the packet reaches nodes B1, B2, or B3 from node G in two time slots; for example, in S4 a packet travels from G to A2, then in S5 the packet travels from A2 to B1, B2, and B3. In this example, the superframe has two cells (Ch 0-S4 and Ch 1-S5) that multicast the packet communication. A multicast is a packet communication from one transmitting node to multiple receiving nodes.

Figure 10J:
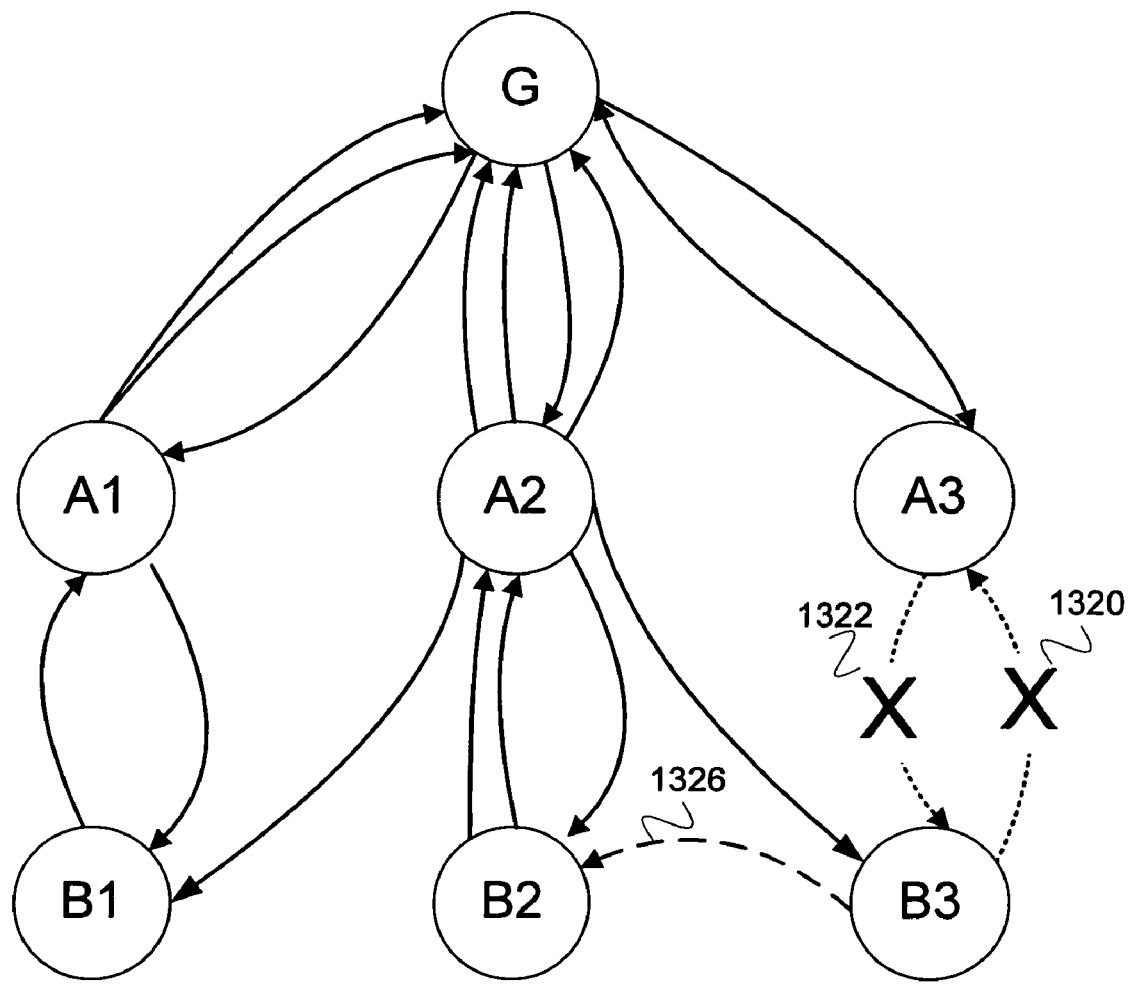
FIG. 10J illustrates an embodiment of a digraph network.

FIG. 10J illustrates an embodiment of a digraph network. In the example illustrated, nodes are connected to each other with directional communication links. The links indicate the direction of transmission of packets. There is communication in the opposite direction of the link in order to acknowledge, or not acknowledge, the proper receipt of a packet after it has been transmitted. Gateway node G is linked to node A1, node A2, and node A3. Node A1 is linked to node G (two links) and to node B1. Node A2 is linked to node G (three links), node B1, node B2, and node B3. Node A3 is linked to node G (and not to node B3 through link 1322). Node B1 is linked to node A1. Node B2 is linked to node A2 (two links). Node B3 is linked to node B2 through link 1326 (and not to node A3 through link 1320). In some embodiments, if communication along a pair of links is no longer possible or desired, then an alternative link can be established by the network for the new requirements that are based on what is possible or desired. For example, if links 1320 and 1322 are no longer possible because of reception or transmission interference or signal strength problems (perhaps due to resource availability issues), then the network can switch to an alternate digraph/superframe. In the alternate digraph/superframe, the assignment of links in the digraph and cells in the superframe are made to accommodate the new requirements. In some embodiments, the resource is power.

In some embodiments, the alternative network links are desirable because the communication frequency between nodes requires change. In some embodiments, a change in state alters the requirements of the network so that an alternate network linking is desirable. In some embodiments, the change of state is a change of network state, a user requested change of state, a change of state stemming from the health reports of the resources states of the network, a change of state from information from upstream (from the gateway end) in the network, a change of state from information from downstream (from the end of the network the farthest from the gateway) in the network, or a change of state from information in a packet. In some embodiments, the alternate digraph/superframe is already preprogrammed in the network and can be utilized by specifying a new digraph/superframe for packet communications. In some embodiments, the gateway node can alter an existing digraph/superframe for the network to alter the communication links.

FIG. 10K illustrates an embodiment of a superframe corresponding to the digraph network of FIG. 10J. In the example illustrated, a superframe containing three channels is shown: channel 0 (Ch 0), channel 1 (Ch 1), and channel 2 (Ch 2). The superframe also contains nine time slots: slot 0 (S0), slot 1 (S1), slot 2 (S2), slot 3 (S3), slot 4 (S4), slot 5 (S5), slot 6 (S6), slot 7 (S7), and slot 8 (S8). A superframe is a structure containing frequency channels and time slots. The superframe is selected to be at least large enough to accommodate the total number of digraph links desired in the superframe. The superframe accommodates digraph links by assigning a digraph link to a cell in the superframe. In some embodiments, a digraph link is assigned to a cell considering other links in the same time slot so that there are no conflicts between the links in the same time slot. For example, a node is not both transmitting and receiving in the same slot. In various embodiments, the total number of links desired in the superframe is all of the links in the digraph network or a subset of the links in the digraph network. In the example illustrated in FIG. 10K, in Ch 0-S0 cell, node B1 sends to node A1. In Ch 2-S0 cell, node B3 sends to node B2. In Ch 0-S1 cell, node A1 sends to node G. In Ch 1-S1 cell, node B2 sends to node A2. In Ch 0- S2 cell, node A1 sends to node B1. In Ch 1-S2 cell, node A2 sends to node G. In Ch 2-S3 cell, node A3 sends to node G. In Ch 0-S4 cell, node A1 sends to G. In Ch 1-S4 cell, node B2 sends to node A2. In Ch 1-S5 cell, A2 sends to G. In Ch 2-S6 cell, A2 sends to G. In Ch 0-S7 cell, node G sends to nodes A1, A2, and A3. In Ch 1-S8 cell, node A2 sends to nodes B1, B2, and B3.

The superframe illustrated in FIG. 10K is optimized for a packet to travel from one end of the digraph network to the other end of the digraph network. In this example, the superframe optimization involves assigning the cells so that packets propagate from one end of the network to the other in an efficient manner and also so that a given node is only transmitting or receiving from one other node. There are many possible cell assignments and that different optimizations can be achieved. In this example, the packet travels from the farthest downstream node B1, B2, or B3 to the farthest upstream (gateway) node G. If a given packet is the top priority in each queue for nodes B1, B2, B3, A1, A2, and A3, the packet reaches node G from nodes B1, B2, or B3 in two or three time slots; for example, in S0 a packet travels from B1 to A1, then in S1 the packet travels from A1 to G and in S0 a packet travels from B3 to B2, then in S1 from B2 to A2, and then in S2 from A2 to G.

This superframe illustrated in FIG. 10K is optimized for a packet to travel from one end of the digraph network to the other end of the digraph network. In this example, the superframe optimization involves assigning the cells so that packets propagate from one end of the network to the other in an efficient manner and also so that a given node is only transmitting or receiving from one other node. There are many possible cell assignments and that different optimizations can be achieved. In this example, the packet travels from the farthest upstream (gateway) node G to the farthest downstream node B1, B2, or B3. If a given packet is the top priority in each queue for nodes G, A1, A2, and A3, the packet reaches nodes B1, B2, or B3 from node G in two time slots; for example, in S4 a packet travels from G to A2, then in S5 the packet travels from A2 to B1, B2, and B3. In this example, the superframe has two cells (Ch0-S4 and Ch1-S5) that multicast the packet communication. A multicast is a packet communication from one transmitting node to multiple receiving nodes. In some embodiments, multicast packet communication does not include having the receiver acknowledge the reception of a transmission.

In the example illustrated in FIG. 10K, the superframe also assigns cells in the superframe assuming that each node will generate a packet in each superframe. In this case, the optimization for assignment of cells includes multiple cells for transmission from certain nodes. Certain digraph links are assigned to a plurality of cells. For example, node B1 sends a packet to node A1 (Ch 0-S0). Node A1 also generates a packet. Node A1 sends to G in two cells (Ch 0-S1 and Ch 0-S4) so that both B1 and A1 originating packets arrive at the gateway within the superframe. Similarly, node B3 sends a packet to node B2 (Ch 2-S0). Node B2 also generates a packet. Node B2 sends to A2 in two cells (Ch 1-S1 and Ch 1-S4) so that both B3 and B2 originating packets arrive at A2. Node A2 also generates a packet. Node A2 sends to G in three cells (Ch 1-S2, Ch 1-S5, and Ch 2-S6) so that B3, B2, and A2 originating packets arrive at the gateway within the superframe.

Figure 11:
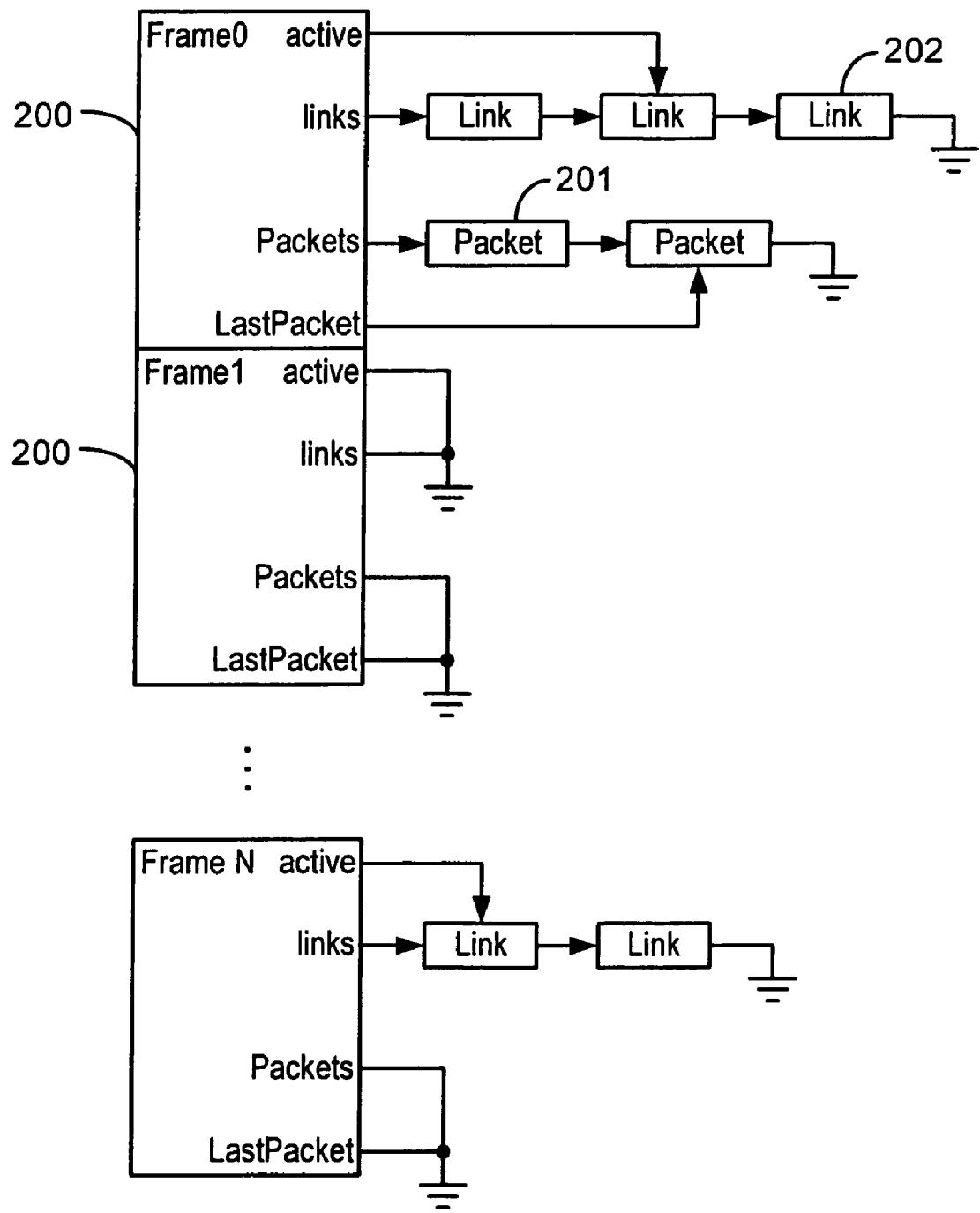
FIG. 11 illustrates an embodiment of how data storage is organized on the intelligent node, with links and packets associated with superframes.

FIG. 11 shows an example of how data storage is organized on the intelligent node, with links and packets associated with superframes. In the example illustrated, the efficiency of spectrum and time usage is shown, suggesting how links can be ordered so that they can be optimized.

Figure 12:
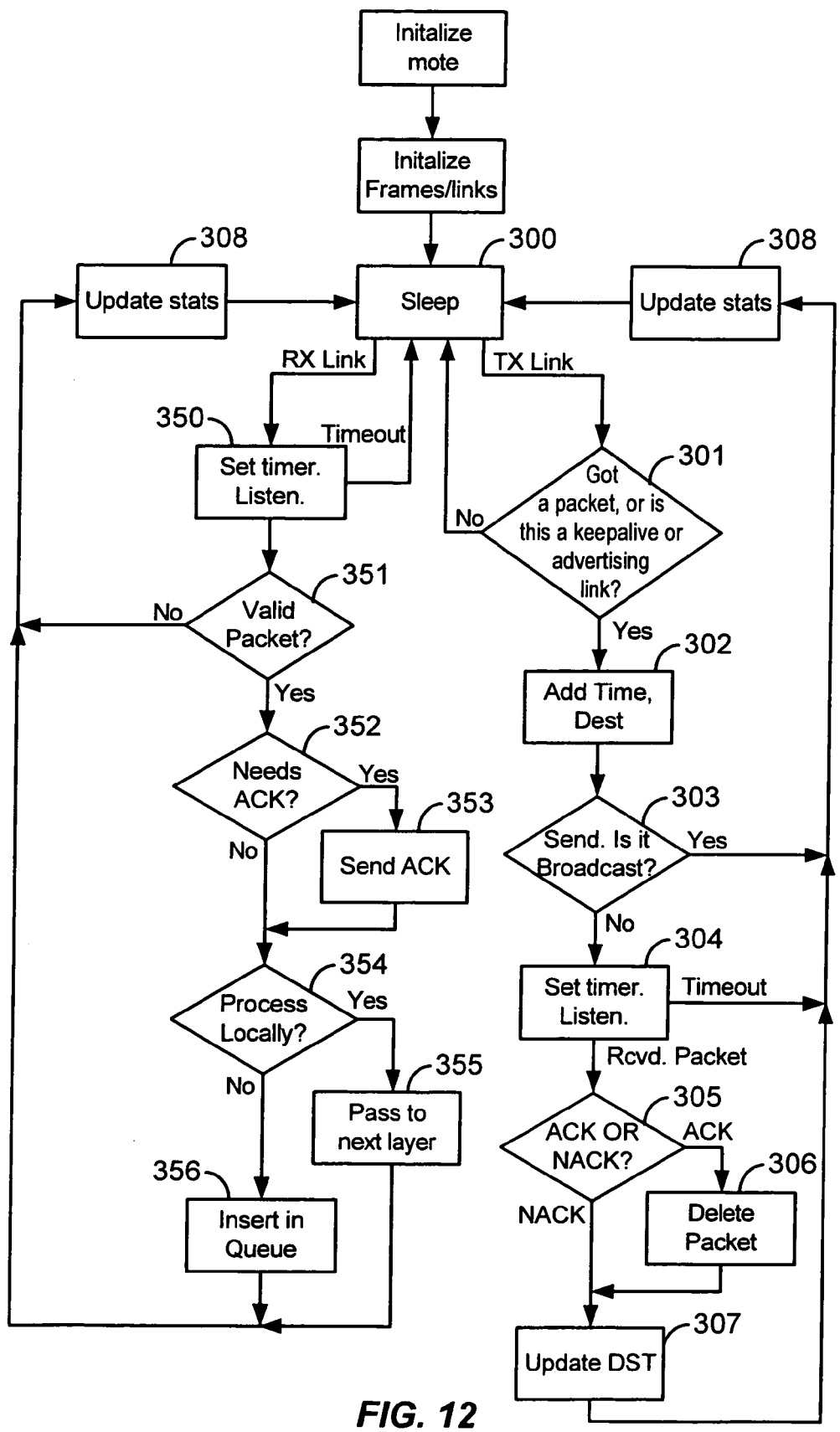
FIG. 12 illustrates an embodiment of an intelligent node state machine associated with communication.

FIG. 12 shows that part of an intelligent node state machine that is associated with communication. Once a mote is initialized, it invokes an idle or sleep state 300 during which it listens 350 until timeout or until it receives a valid packet 351, acknowledges 353. It determines whether to process the packet locally 354, whereupon the packet is passed to the next layer 355 or is inserted in a queue 356, and then status is updated.

On a transmit link, it decides if it has a packet to send (or a beacon signal) 301 and adds destination and time of transmission stamps 302 to send, either direct or via broadcast 303. If direct it sets a timeout and listens for acknowledgment 304, identifies positive or negative acknowledgments 305 and either deletes the packet 306 and/or updates the standard internal time 307.

Figure 13:
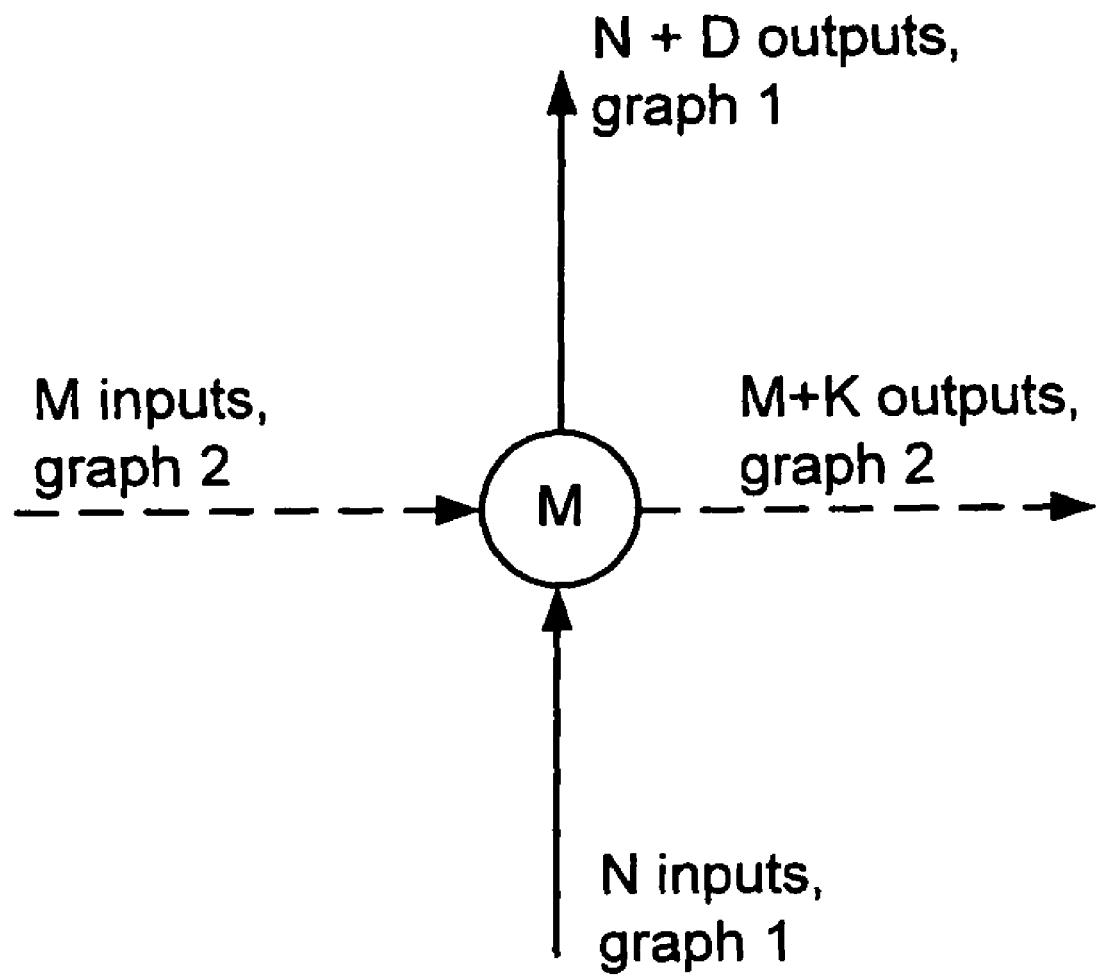
FIG. 13 illustrates an embodiment of signal types into and out of an intelligent node.

FIG. 13 is a diagram that illustrates signal types on directed links into and out of an intelligent node. It is understood that there are at least three nodes in the digraph. There is are N inputs from a first graph to an intelligent node N and M inputs from graph 2 to intelligent node M, which will respectively result in N plus D outputs on graph 1 and M plus K outputs on graph 2, indicative of a potential for increase and even crossover of graphs in a superframe. Significantly, the power consumed at intelligent node M is minimized for transmission and receipt by providing for a minimal power idle state when the node is not actively receiving or transmitting in accordance with the synchronization of timing among nodes in the digraph.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A network of nodes comprising:
   A plurality of nodes;
   wherein each of the plurality of nodes is associated with at least one link;
   wherein the at least one link comprises a periodic communication between two or more of the plurality of nodes;
   wherein two or more of the plurality of nodes that are associated with the periodic communication are synchronized in time; and
   wherein a characteristic of the periodic communication is varied according to a known sequence, wherein the known sequence of each period associated with a cycle number is based at least in part on a time slot within the period of the periodic communication, a channel, and the cycle number.

2. A network as in claim 1, wherein the periodic communication is scheduled according to a superframe.

3. A network as in claim 2, wherein the superframe is one of a plurality of superframes.

4. A network as in claim 3, wherein the plurality of superframes are operating concurrently.

5. A network as in claim 1, wherein the periodic communication comprises transmitting an radio wave by a first node and receiving the radio wave by a second node.

6. A network as in claim 1, wherein the characteristic of the periodic communication that is varied comprises a frequency that is varied according to a known sequence.

7. A network as in claim 6, wherein the frequency comprises a frequency in the 902-928 MHz ISM band.

8. A network as in claim 6, wherein the frequency comprises a frequency in the 2.4-2.483 GHz ISM band.

9. A network as in claim 1, wherein the periodic communication occurs as part of a cycle.

10. A network as in claim 1, wherein the periodic communication occurs at a regular interval.

11. A network as in claim 1, wherein the periodic communication occurs at a known irregular interval.

12. A network as in claim 1, wherein the periodic communication includes an acknowledgement of receipt.

13. A network as in claim 1, wherein the at least one link includes a redundant link.

14. A network as in claim 13, wherein the redundant link is not used in the event that there is no data to be sent.

15. A network as in claim 1, wherein a node of the plurality of nodes includes a crystal oscillator.

16. A network as in claim 15, wherein the crystal oscillator comprises a 32 kHz quartz crystal.

17. A network as in claim 15, wherein the node includes a temperature sensor.

18. A network as in claim 15, wherein the node includes a compensation circuit.

19. A network as in claim 1, wherein the two or more of the plurality of nodes are synchronized in time at least in part by exchanging timing information.

20. A network as in claim 1, wherein the at least one link is between a transmitting vertex and a receiving vertex.

21. A network as in claim 20, wherein one of the two or more of the plurality of nodes associated with the at least one link comprises the transmitting vertex.

22. A network as in claim 20, wherein one of the two or more of the plurality of nodes associated with the at least one link comprises the receiving vertex.

23. A network as in claim 20, wherein the transmitting vertex is associated with a digraph.

24. A network as in claim 20, wherein the receiving vertex is associated with a digraph vertex.

25. A method of communicating for a network of nodes comprising:
- transmitting a communication, using a radio transmitter, from a node to one or more of a plurality of network nodes;
- wherein each of the plurality of nodes is associated with at least one link;
- wherein the at least one link comprises a periodic communication;
- wherein two or more of the plurality of network nodes that are associated with the periodic communication are synchronized in time; and
- wherein a characteristic of the periodic communication is varied according to a known sequence, wherein the known sequence of each period associated with a cycle number is based at least in part on a time slot within the period of the periodic communication, a channel, and the cycle number.

26. A method of communicating for a network of nodes comprising:
- receiving a communication, using a radio receiver, at one or more nodes from one of a plurality of network nodes;
- wherein each of the plurality of nodes is associated with at least one link;
- wherein the at least one link comprises a periodic communication;
- wherein two or more of the plurality of network nodes that are associated with the periodic communication are synchronized in time; and
- wherein a characteristic of the periodic communication is varied according to a known sequence, wherein the known sequence of each period associated with a cycle number is based at least in part on a time slot within the period of the periodic communication, a channel, and the cycle number.

* * * * *